Aug. 7, 1962 J. TELLERMAN ETAL 3,048,713

"AND" AMPLIFIER WITH COMPLEMENTARY OUTPUTS

Filed Feb. 8, 1960

INVENTORS
JACOB TELLERMAN
ALBERT ZARETSKY
BY Raymond A. Paquin
ATTORNEY.

3,048,713

"AND" AMPLIFIER WITH COMPLEMENTARY OUTPUTS

Jacob Tellerman and Albert Zaretsky, Brooklyn, N.Y., assignors to American Bosch Arma Corporation, a corporation of New York Filed Feb. 8, 1960, Ser. No. 7,382
7 Claims. (Cl. 307—88.5)

The present invention relates to digital computers and has particular reference to gating means for selecting the channel into which pulses are gated.

Figure 1:
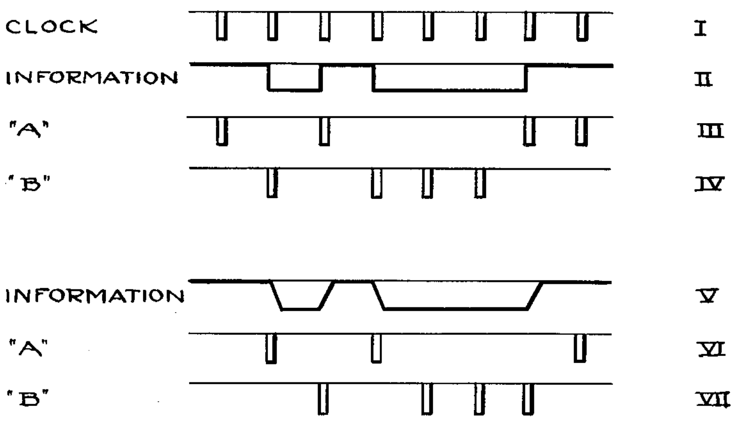

In digital computer circuitry, it is often necessary to gate pulses into either of two channels, depending on the presence or absence of controlling information. That is, the pulses appearing on one channel are the complement of the pulses on the other channel. An example of this is shown in FIG. 1.

Common methods of accomplishing this require many components, appreciable gate power and are somewhat complex. In a typical instance, a pair of "and" circuits are required, one gated on and the other off by the controlling information and each fed by the pulse train. The gating of the second "and" circuit requires an inversion circuit between the controlling signal and the "and" circuit.

The present invention provides a simple circuit for this purpose and, in addition, provides power gain for the controlling gate.

The pulse train is connected across one output channel through one diode which is biased to its low impedance condition by a current of polarity opposite to the pulse signal. A switching transistor, normally cut off, is also connected across this output channel. A gating signal to the transistor effectively shorts the output channel to ground and removes the biasing signal from another diode which is connected in series with the pulse signal and a pulse transformer connected across the other output channel. Thus, the pulse appears across the second channel only.

Figure 2:
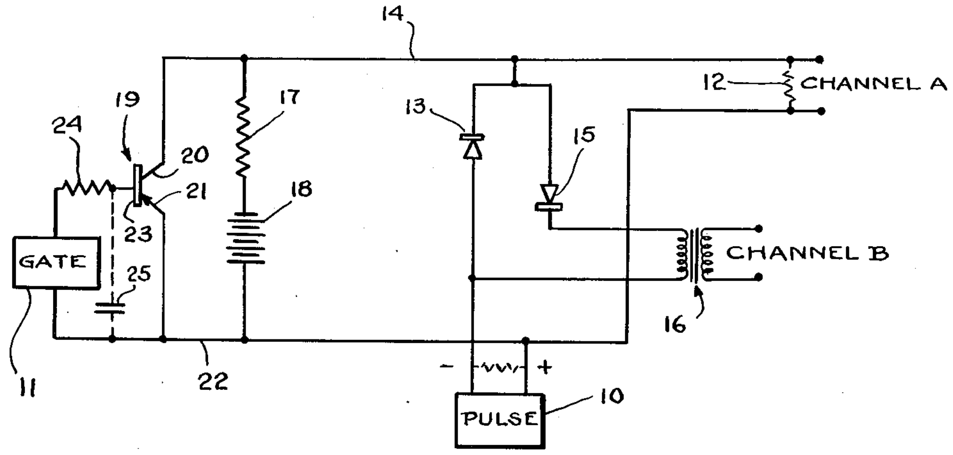

For a more complete understanding of this invention, reference may be had to the accompanying diagrams in which, FIG. 1 shows the time relationship of the pulses which occur in this invention; and FIG. 2 shows a preferred embodiment of the invention.

With respect to FIG. 1, the clock pulses, curve I, are introduced into the circuit and are available at either one of two output channels A or B, depending upon the information contained in a pulse signal train curve II. Thus, in the absence of an information pulse, the clock pulses appear at channel A, curve III, while the existence of an information voltage causes the clock pulses to appear at channel B, curve IV. The pulses in channel B, therefore, can be said to be the complement of the pulses in channel A.

With respect now to FIG. 2, the output channels are marked channel A and channel B, the input (clock) pulse train is obtained from a pulse source 10 and the control (information) signal comes from gate signal source 11. The pulse source is a low impedance source and this is indicated by the dotted resistor **10*a* which shunts the pulse source 10. The load to channel A is represented by resistor 12**, which may be internal to channel A but is indicated here for completeness of the circuit.

The anode of a diode 13 is connected to the negative side of source 10 and the cathode of the diode 13 is connected through lead 14 to one side of the load 12. The other side of load 12 is connected to the positive side of pulse source 10 through the common lead 22. A second diode 15 is connected in series with the primary winding of a pulse transformer 16 across diode 13 in a fashion such that the cathode of diode 13 is connected to the anode of diode 15.

The diodes 13 and 15 are biased by a voltage source which is connected between the positive side of source 10 and the cathode of diode 13 through a resistor 17. The bias voltage is greater in magnitude than the pulse voltage so that the diode 13 is normally in its low impedance state while diode 15 is in its high impedance state. Thus, a negative pulse from source 10, as shown in FIG. 1, will be routed through diode 13 to appear at channel A.

A PNP switching transistor 19 has its collector 20 connected to power supply 18, through resistor 17, and its emitter 21 connected to the common line 22, which connects to the positive terminals of power supply 18 and pulse source 10 and to one side of resistor 12. The gate signal source 11, whose output is a series of negative non-return to zero gates such as shown in FIG. 1, curve II, is connected between the emitter 21 and base 23 of the transistor 19.

When the gate signal is applied to the transistor 19, channel A is effectively shorted to the common lead 22 by the action of the switching transistor 19. The low impedance circuit between leads 22 and 14 through transistor 19, therefore, removes the bias voltage from diodes 15 and 13 and establishes the high impedance state of diode 13. Thus, the pulse from source 10 now goes through the low impedance established between leads 22 and 14 through diode 15 and transformer 16, back to the source 10. The pulse, therefore, appears in the B channel output.

In brief, whenever a gate signal appears at the transistor 19, the clock pulse from source 10 appears at channel B, and if no signal is present at source 11 the clock pulse from source 10 appears at channel A.

If desired, a one digit delay in the outputs A and B may be obtained by using an R-C network 24—25, shown dotted in FIG. 2, in the transistor input between the source 11 and base 23 whereby the response time of the R-C network and the transistor, combined, is such as to cause the output signal pulse of gate 11 to operate on the transistor 19 during the next clock pulse rather than clock pulse generated with the gate pulse, so that the next clock pulse is gated to one of the channel outputs. This one digit delayed output will be obtained without the input R-C network if the gate is delayed or poorly shaped in its passage through normal logic chains.

This effect is shown in curves V, VI and VII of FIG. 1 where the information gate signal may be such as shown in curve V instead of the ideal curve II. Control of the clock pulses I is then preferably accomplished by the gate signal which is present just before the clock pulse in order to eliminate the ambiguity of the transient in curve V which occurs during the clock pulse. Therefore, by delaying the gate actuation until the clock pulse has passed, the next clock pulse will be directed to the appropriate channel A or B as indicated by curves VI and VII respectively. It will be seen that the pulses of curve VI are delayed by one pulse with respect to those of curve III and a similar relationship exists between curves VII and IV.

It will be recognized that many changes can be made in the preferred embodiment within the scope of the invention. Other switching transistors may be employed, for example. For positive pulse systems the transistor must be an NPN type, since the diodes and the power supply for the transistor and diode biasing must be reversed in polarity to that shown in FIG. 2.

Summarizing the operation, the transistor 19 is normally cut off in the absence of any gate input so that in effect resistor 17 and diode 13 form a simple one input "and" circuit with the pulse transformer 16 being blocked by the back biased diode 15. A negative pulse appearing at the pulse source 10 reduces the forward current through diode 13 but not enough to bring the diode 13 out of its low impedance forward region so that the entire pulse appears at A with no drop across diode 13. Obviously, there is a zero voltage drop across the pulse transformer 16, so that no pulse appears in channel B.

When the control gate 11 switches the transistor 19 on, the A channel is clamped to the common lead 22, reducing the forward current through diode 13 to zero. A negative pulse at the pulse source 10 is, therefore, blocked by diode 13 and appears across the pulse transformer 16 since diode 15 is in the forward direction and channel A is shorted out by transistor 19. Thus, the pulse now appears at the channel B output.

We claim:

1. In a device of the character described, a pair of output channels, a source of pulses, a controlling voltage having two distinct levels, means for applying pulses from said source of pulses to either of said channels selectively as controlled by said controlling voltage, said means for applying pulses including a diode connected between one of said channels and said source of pulses and having its anode connected to the negative terminal of said source of pulses, voltage means connected across said one channel for biasing said diode to a low impedance condition, switching means connected across said channel and operated by said controlling voltage to effectively short out said channel at one level of said controlling voltage and to maintain the diode in the low impedance state at the other level of said controlling voltage.

2. In a device of the character described, a pair of output channels, a source of pulses, a controlling voltage having two distinct levels, means for applying pulses from said source of pulses to either of said channels selectively as controlled by said controlling voltage, said means including a diode connected between one of said channels and said pulse source and having its anode connected to the positive terminal of said pulse source, means for biasing said diode to its high impedance state, switching means connected to said biasing means and operated by said controlling voltage to effectively remove the bias from said diode at one level of said controlling voltage and to maintain said diode in the high impedance state at the other level of said controlling voltage.

3. In a device of the character described, a pair of output channels, a source of pulses, a controlling voltage having two distinct levels, means for applying pulses from said source of pulses to either of said channels selectively as controlled by said controlling voltage, said means including a first diode connected between said pulse source and one of said channels in a reverse direction, a second diode connected between said pulse source and the other of said channels in the forward direction, voltage means across said one channel for biasing said first diode into a low impedance state and said second diode into a high impedance state, switching means operated by said controlling signal and effective to short out said one channel and simultaneously remove the bias from said second diode at one controlling voltage level and at the other controlling voltage level to establish the high impedance state of the second diode and the low impedance state of the first diode.

4. In a device of the character described, a pair of output channels, a source of pulses, a controlling voltage having two distinct levels, means for applying pulses from said source of pulses to either of said channels selectively as controlled by said controlling voltage, said means for applying pulses including a diode connected between one of said channels and said source of pulses and having its anode connected to the negative terminal of said source of pulses, voltage means connected across said one channel for biasing said diode to a low impedance condition, switching means including a transistor connected across said channel and operated by said controlling voltage to effectively short out said channel at one level of said controlling voltage and to maintain the diode in the low impedance state at the other level of said controlling voltage.

5. In a device of the character described, a pair of output channels, a source of pulses, a controlling voltage having two distinct levels, means for applying pulses from said source of pulses to either of said channels selectively as controlled by said controlling voltage, said means including a diode connected between one of said channels and said pulse source and having its anode connected to the positive terminal of said pulse source, means for biasing said diode to its high impedance state, switching means including a transistor connected to said biasing means and operated by said controlling voltage to effectively remove the bias from said diode at one level of said controlling voltage and to maintain said diode in the high impedance state at the other level of said controlling voltage.

6. In a device of the character described, a pair of output channels, a source of pulses, a controlling voltage having two distinct levels, means for applying pulses from said source of pulses to either of said channels selectively as controlled by said controlling voltage, said means including a first diode connected between said pulse source and one of said channels in a reverse direction, a second diode connected between said pulse source and the other of said channels in the forward direction, voltage means across said one channel for biasing said first diode into a low impedance state and said second diode into a high impedance state, switching means including a transistor operated by said controlling signal and effective to short out said one channel and simultaneously remove the bias from said second diode at one controlling voltage level and at the other controlling voltage level to establish the high impedance state of the second diode and the low impedance state of the first diode.

7. In a device of the character described, a source of pulses, a control signal source, a first and second output channel, a transistor, said control signal source being connected across the base and emitter electrodes of said transistor, said first output channel being connected across the emitter and collector electrodes of said transistor, a voltage source connected across the emitter and collector of said transistor, a first diode connected between one side of said pulse source and the collector of said transistor, a second diode and the second output channel being connected in series between said collector and said one side of said pulse source, the other side of said pulse source being connected to the said emitter of said transistor.

References Cited in the file of this patent

UNITED STATES PATENTS 2,812,541 Curtis ---------- Nov. 5, 1957
2,935,627 Schneider ---------- May 3, 1960